United States Patent
Zhu (10) Patent No.: US 11,953,128 B2
(45) Date of Patent: Apr. 9, 2024

(54) PIPE CLIP

(71) Applicant: HellermannTyton (Wuxi) Electrical Accessories Co., Ltd., Wuxi (CN)

(72) Inventor: Bing Zhu, Wuxi (CN)

(73) Assignee: Hellermann Tyton (WUXI) Electrical Accessories Co., Ltd., Wuxi (CN)

( * ) Notice: Subject to any disclaimer, the term of this patent is extended or adjusted under 35 U.S.C. 154(b) by 0 days.

(21) Appl. No.: 17/817,921

(22) Filed: Aug. 5, 2022

(65) Prior Publication Data
US 2023/0042090 A1 Feb. 9, 2023

(30) Foreign Application Priority Data
Aug. 6, 2021 (CN) .......................... 202110901942.7

(51) Int. Cl.
*F16L 3/10* (2006.01)
*F16L 3/237* (2006.01)

(52) U.S. Cl.
CPC ............. *F16L 3/1091* (2013.01); *F16L 3/237* (2013.01)

(58) Field of Classification Search
CPC . F16L 3/1091; F16L 3/237; F16L 3/10; F16L 3/1025; F16L 3/1033; F16L 3/1041; F16L 3/1075; F16L 3/1083; F16L 3/22; H02G 3/32
USPC ................................................ 248/68.1, 67.7
See application file for complete search history.

(56) References Cited

U.S. PATENT DOCUMENTS

| | | | |
|---|---|---|---|
| 4,105,814 A | 8/1978 | Eggert | |
| 4,184,297 A | 1/1980 | Casamayor | |
| 4,224,721 A * | 9/1980 | Ohlson | F16B 7/0433 248/68.1 |
| 4,395,009 A * | 7/1983 | Bormke | H02G 3/32 174/157 |
| 4,690,412 A | 9/1987 | Tuckley et al. | |

(Continued)

FOREIGN PATENT DOCUMENTS

| | | |
|---|---|---|
| EP | 3061977 | 4/2018 |
| EP | 3263916 | 4/2020 |

(Continued)

OTHER PUBLICATIONS

"Edge Mount Cable Tie Mount", Retrieved at: https://media.digikey.com/pdf/Data%20Sheets/Richco%20Inc%20PDFs/EdgeMountCableTie_CutSheet.pdf—on Jul. 27, 2022, 2 pages.

(Continued)

*Primary Examiner* — Christopher Garft
(74) *Attorney, Agent, or Firm* — Colby Nipper PLLC (57) ABSTRACT

This document describes a pipe clip for quick mount and release. In aspects, the pipe clip includes a base and an upper cover, with several arc-shaped cavities provided on the base. The outer side of the arc-shaped concave cavity is provided with connecting column and racks. The upper cover is provided with a pressing concave cavity corresponding to each arc-shaped concave cavity. The base and upper cover configured to form a pipe cavity by combining one arc-shaped concave cavity and one pressing concave cavity. The upper cover is provided with a perforation corresponding to the connecting column and the connecting column is configured to penetrate through the perforation so that the upper cover can rotate around the connecting column.

20 Claims, 5 Drawing Sheets

(56) References Cited

U.S. PATENT DOCUMENTS

| | | |
|---|---|---|
| 5,098,054 A | 3/1992 | Dyer |
| 5,148,576 A | 9/1992 | Dyer |
| 5,157,815 A | 10/1992 | Dyer |
| 5,216,784 A | 6/1993 | Dyer |
| 5,301,917 A | 4/1994 | Dyer |
| 5,505,411 A | 4/1996 | Heaton et al. |
| 5,772,258 A | 6/1998 | Dyer et al. |
| 5,820,083 A | 10/1998 | Geiger |
| 5,937,488 A | 8/1999 | Geiwer |
| 6,112,499 A | 9/2000 | Lyskawa et al. |
| 6,523,790 B2 * | 2/2003 | Sentpali ............... F16L 55/035 248/68.1 |
| 6,736,669 B1 * | 5/2004 | Martin .................... H02G 3/32 439/607.41 |
| 6,991,102 B2 | 1/2006 | Kurmis |
| D543,835 S | 6/2007 | Geiger |
| 7,725,991 B2 | 6/2010 | Lubera et al. |
| 7,753,320 B2 | 7/2010 | Geiger et al. |
| 7,819,365 B2 | 10/2010 | Elsner |
| 7,938,365 B2 * | 5/2011 | Guthke .................. H02G 3/30 244/129.1 |
| 8,141,826 B1 * | 3/2012 | Gallardo .................. F16L 3/24 248/65 |
| 8,177,173 B2 | 5/2012 | Spiess |
| 8,313,064 B2 | 11/2012 | Stocker |
| 8,578,571 B2 | 11/2013 | Schmidt |
| D734,654 S | 7/2015 | Geiger et al. |
| 9,328,756 B2 | 5/2016 | Kuhm |
| D760,067 S | 6/2016 | Geiger |
| D784,799 S | 4/2017 | Toll et al. |
| D793,215 S | 8/2017 | Gallion et al. |
| D804,942 S | 12/2017 | Toll et al. |
| D811,869 S | 3/2018 | Gallion et al. |
| D815,939 S | 4/2018 | Geiger et al. |
| D816,471 S | 5/2018 | Gallion et al. |
| D822,476 S | 7/2018 | Haftarski et al. |
| D824,622 S | 7/2018 | Toll et al. |
| D829,090 S | 9/2018 | Toll et al. |
| 10,082,224 B2 | 9/2018 | Otterstrom |
| D829,540 S | 10/2018 | Gallion et al. |
| D840,799 S | 2/2019 | Haftarski et al. |
| 10,208,874 B2 | 2/2019 | Geiger et al. |
| 10,316,991 B2 | 6/2019 | Gallion |
| 10,323,774 B2 | 6/2019 | Van Hulst et al. |
| 10,399,516 B2 | 9/2019 | Chapman |
| 10,428,976 B2 | 10/2019 | Matz |
| 10,903,632 B2 | 1/2021 | Toll et al. |
| D909,843 S | 2/2021 | Van Hulst et al. |
| D909,844 S | 2/2021 | Van Hulst et al. |
| 11,420,571 B1 | 8/2022 | Spearing |
| 11,873,851 B2 | 1/2024 | Miraboutalebi et al. |
| 2002/0071715 A1 | 6/2002 | Geiger |
| 2002/0084388 A1 | 7/2002 | Geiger |
| 2003/0222184 A1 | 12/2003 | Geiger |
| 2005/0242247 A1 | 11/2005 | Geiger |
| 2007/0007396 A1 * | 1/2007 | Wien ...................... F16L 3/237 248/68.1 |
| 2007/0272807 A1 | 11/2007 | Takagaki |
| 2009/0236486 A1 | 9/2009 | Matsuno et al. |
| 2010/0199463 A1 | 8/2010 | Kudo |
| 2011/0303456 A1 * | 12/2011 | Blanchard ............... F16L 3/222 248/68.1 |
| 2012/0217355 A1 | 8/2012 | Geiger et al. |
| 2013/0119208 A1 | 5/2013 | Geiger |
| 2014/0091182 A1 * | 4/2014 | Fukumoto ............. F16L 3/2235 248/68.1 |
| 2016/0223100 A1 | 8/2016 | Geiger |
| 2017/0059060 A1 | 3/2017 | Gallion et al. |
| 2017/0227141 A1 | 8/2017 | Toll et al. |
| 2018/0266587 A1 * | 9/2018 | Booth .................. F16L 3/1075 |
| 2023/0042349 A1 | 2/2023 | Miraboutalebi et al. |

FOREIGN PATENT DOCUMENTS

| | | |
|---|---|---|
| FR | 3074547 | 6/2019 |
| JP | 6546699 | 7/2019 |

OTHER PUBLICATIONS

"Extended European Search Report", EP Application No. 21190204.4, dated Jan. 28, 2022, 9 pages.

"Non-Final Office Action", U.S. Appl. No. 17/817,797, dated Jun. 12, 2023, 8 pages.

"Notice of Allowance", U.S. Appl. No. 17/817,797, dated Sep. 6, 2023, 6 pages.

* cited by examiner

PIPE CLIP

INCORPORATION BY REFERENCE

This application claims priority to Chinese Patent Application Number 202110901942.7, filed Aug. 6, 2021, the disclosure of which is incorporated by reference in its entirety.

BACKGROUND

At present, pipe clip products (e.g., pipe clips, pipe clamps) are increasingly used in high-voltage wire harnesses, and the requirements on fixing method for various pipe diameters are stricter. The existing pipe clip mainly consists of a cover plate, a bottom plate and one or more groups of screws and nuts, and the cover plate and the bottom plate are assembled to form a pipe cavity with a specific shape, and then the cover plate and the bottom plate are fastened by the screws and the nuts for clamping a wire harness or a pipeline in the pipe cavity. The above pipe clip structure has the following problems: 1) the shape of the pipe cavity is fixed, while the wire harness pipelines with different pipe diameters need to match with pipe clips with corresponding sizes, resulting in poor universality of the device; 2) the screw nut structure is complex to disassemble and assemble, and needs to be operated by means of tools; 3) in a vibration working condition, the nut is easy to loosen, resulting in failure of the fastening function; and 4) the separated cover plates and bottom plates need to be stored in pairs, thus easily resulting in situations of missing and disordering.

SUMMARY

Disclosed are pipe clips configured for quick mount and release, which improves the convenience for the operation and the structural stability for the pipe clip. In order to achieve the above purpose, aspects of pipe clips configured for quick mount and release may employ the following technical solution: a pipe clip which comprises a base and an upper cover, several arc-shaped cavities are provided on the base, and the outer side of the arc-shaped concave cavity is provided with connecting column and racks. The racks are provided with two and are distributed on both sides of the connecting column. The upper cover is provided with a pressing concave cavity corresponding to each arc-shaped concave cavity, and an pipe cavity is to be formed by combining one arc-shaped concave cavity and one pressing concave cavity. The upper cover is provided with a perforation corresponding to the connecting column, the connecting column penetrates through the perforation so that the upper cover can rotate around the connecting column, the upper cover is provided with insertion slot corresponding to the rack, and a clamping edge is provided within the insertion slot, when the clamping edge acts on the rack, the upper cover and the base are locked relative to each other, the deformation of the clamping edge is to realize the switch from the active state to the non-active state of the rack.

In aspects, the end of the connecting column is provided with a limit flange, and the perforation is provided with a hook to stop the limit flange to prevent the upper cover from coming out.

In aspects, a sector block protrudes from the curved wall of the limit flange, and a first stopper is provided on the inner wall of the perforation, when the sector block and the first stopper are axially overlapped or partially overlapped, the axial displacement of the connecting column is restricted; when the sector block and the first stopper are axially misaligned, the connecting column can freely pass through the perforation.

In aspects, a convex block is provided in the middle of the connecting column, and when the axial displacement of the connecting column is restricted, the convex block is pressed against the hook, when the connecting column can freely pass through the perforation, the convex block and the hook are dislocated.

In aspects, a second stopper for limiting the rotation direction of the sector block is erected on one end of the first stopper.

In aspects, the sector blocks are provided with two and are centrally symmetric, the central angle of the sector blocks is 75° to 90°, and the first stoppers are also provided with two and is centrally symmetric.

In aspects, a positioning plate is provided at the root of the connecting column, and a positioning groove is opened on the upper cover, when the upper cover is combined with the base, the rack is inserted into the insertion slot, while the positioning plate is inserted into the positioning groove.

In aspects, the base and the upper cover are integrally injection-molded, and a pressing portion that facilitates driving and deformation extends from the clamping edge.

In aspects, the surfaces of the arc-shaped concave cavity and the pressing concave cavity are respectively provided with convex ribs.

In aspects, the base is provided with an installation clip for connection and fixation.

Aspects of disclosed pipe clips for quick mount and release may have one or more of the following advantages: 1) by changing the position where the clamping edge fits with the clamping teeth on the rack, the gap between the upper cover and the base is adjusted, and in turn the size of the pipe cavity is adjusted, which facilitates the adaption to various wire harness pipe diameters, and improves the universality; 2) based on the form of the clamping edges matching with the racks, the mount and the release can be simply completed through inserting and buckling as well as pressing by fingers, and in addition, the wiring harness can be simply avoided by rotating the upper cover, which facilitates the operation; 3) the structure is simple and stable, and the service life is long; or 4) the upper cover is connected with the base in pair, and the upper cover is provided with an anti-disengagement structure, and thus the storage and the transportation are convenient.

This Summary is provided to introduce simplified concepts of a pipe clip for quick mount and release, which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of pipe clips for quick mount and release are described with reference to the following Drawings.

DETAILED DESCRIPTION

This document describes pipe clips configured for quick mount and release. In aspects, a pipe clip for quick mount and release may include a fixing device for a wire harness pipeline (e.g., a pipe clip, a pipe clamp). Aspects of pipe clips for quick mount and release are described in detail below, and examples of the embodiments are illustrated in the drawings, wherein like or similar reference numerals refer to the same or similar parts or parts having the same or similar functions throughout the context. The embodiments described below with reference to the drawings are illustrative and intended to be used for demonstrating aspects of pipe clips for quick mount and release but not to be construed as the limitation to the disclosed aspects.

In the description of the aspects of pipe clips for quick mount and release, unless otherwise expressly specified or limited, the terms "connected" and "fixed" are to be construed broadly, e.g., as meaning a fixed connection, a removable connection, a mechanical connection, an electrical connection, an indirect connection via an intermediary, a connectivity between the interiors of two elements, or an interaction relationship between two elements. The specific meanings of the above terms in the disclosed aspects of pipe clips for quick mount and release can be understood by those skilled in the art according to specific situations.

In the description of the aspects of pipe clips for quick mount and release, unless otherwise expressly specified or limited, the first feature being "on" or "under" the second feature may include the first feature and the second feature being in direct contact, or may include the first feature and the second feature being in contact not directly but with another feature therebetween. Also, the first feature being "over", "above" and "upon" the second feature includes the first feature being directly on and obliquely above the second feature, or merely indicates that the level of the first feature is higher than that of the second feature. A first feature being "under", "below", and "beneath" a second feature includes the first feature being directly under and obliquely below the second feature, or simply means that the level of the first feature is lower than that of the second feature.

The technical solution of aspects of pipe clips for quick mount and release is further described by the specific embodiments in combination with the drawings.

Figure 1:
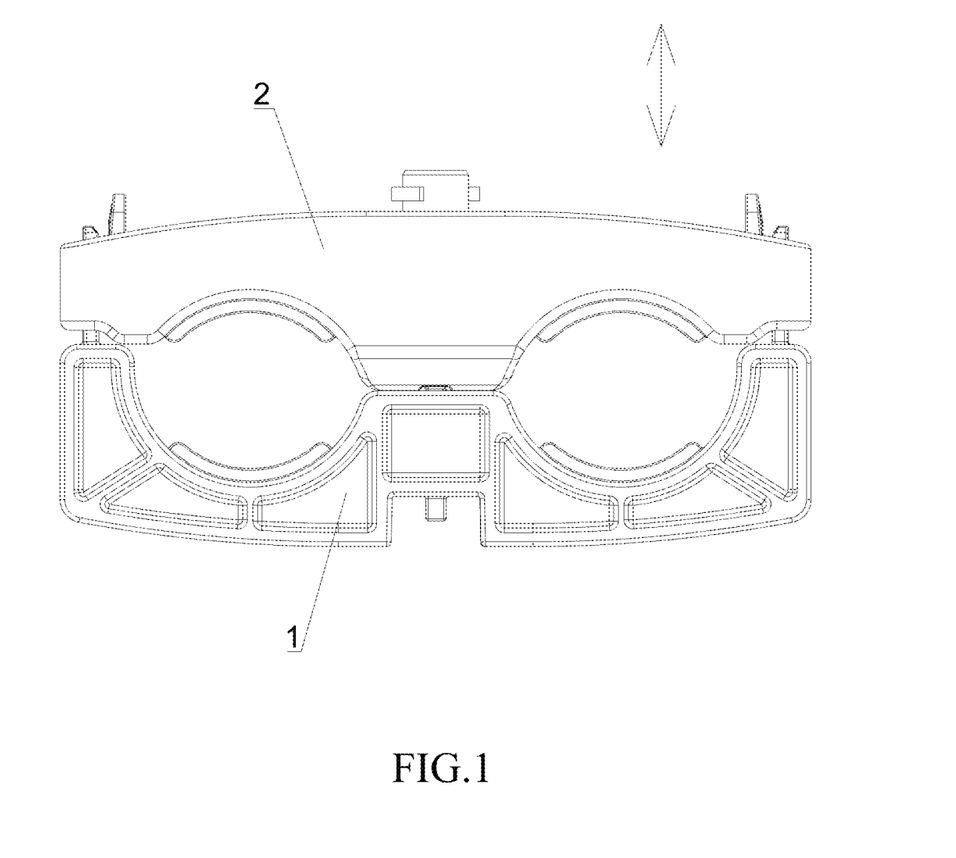
FIG. 1 is a schematic view of an assembly of a pipe clip for quick mount and release according to an aspect.

Referring to FIG. 1, this embodiment provides a pipe clip for quick mount and release, which includes a base 1 and an upper cover 2, both of which are integrally formed by injection molding, which leads to a light, simple structure, and/or low cost.

Figure 2:
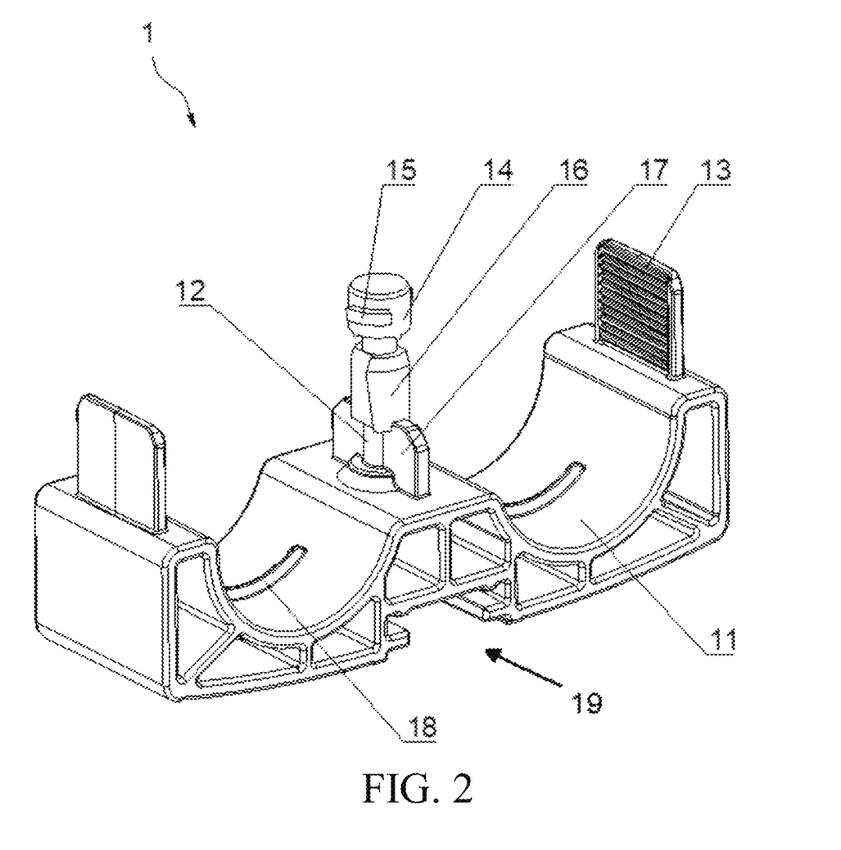
FIG. 2 is a schematic structural view of the base of the pipe clip for quick mount and release according to an aspect.
Figure 3:
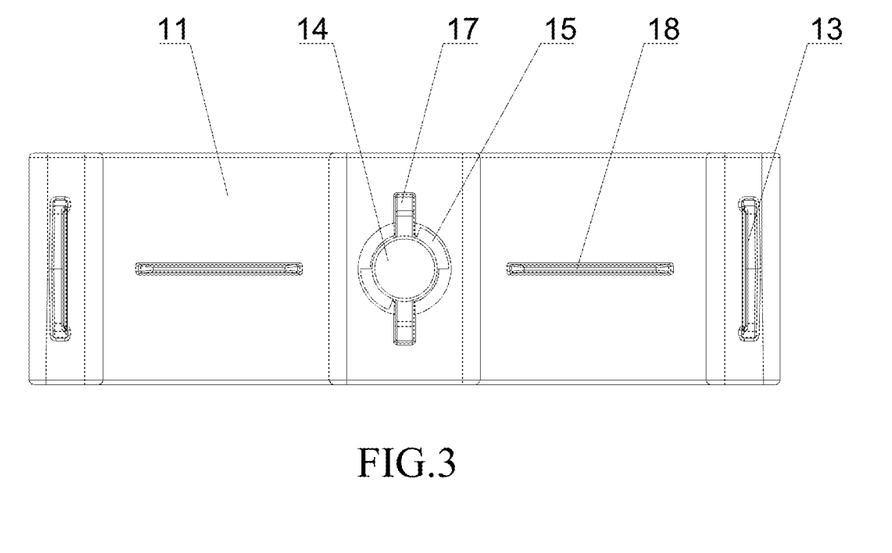
FIG. 3 is a top view of the aspect of FIG. 2.

As shown in FIG. 2 and FIG. 3, several arc-shaped cavities 11 are provided on the base 1, and the outer side portion of the arc-shaped concave cavity 11 is provided with connecting column 12 and at least one rack 13 distributed on each side of the connecting column 12. The connecting column 12 may be located at the center of the base 1, and the two racks 13 are located at the two ends of the base 1. This example embodiment includes an arrangement of two arc-shaped cavities 11. On the basis of it, expansion can be made, and the number of racks 13 can be increased appropriately.

Figure 4:
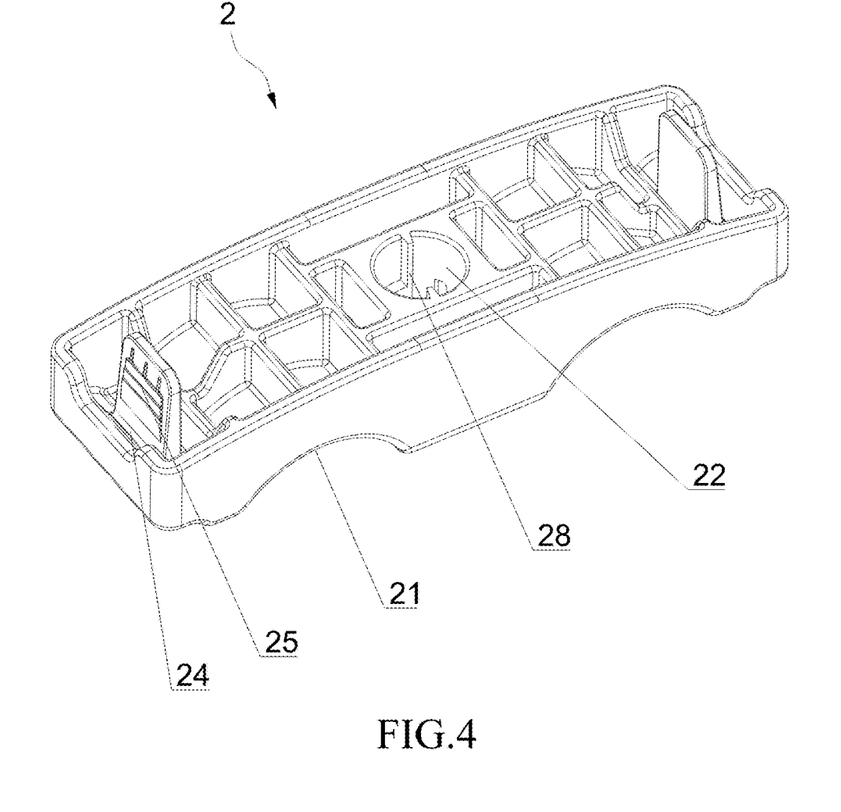
FIG. 4 is a schematic structural view of an upper cover of the pipe clip for quick mount and release according to an aspect.
Figure 5:
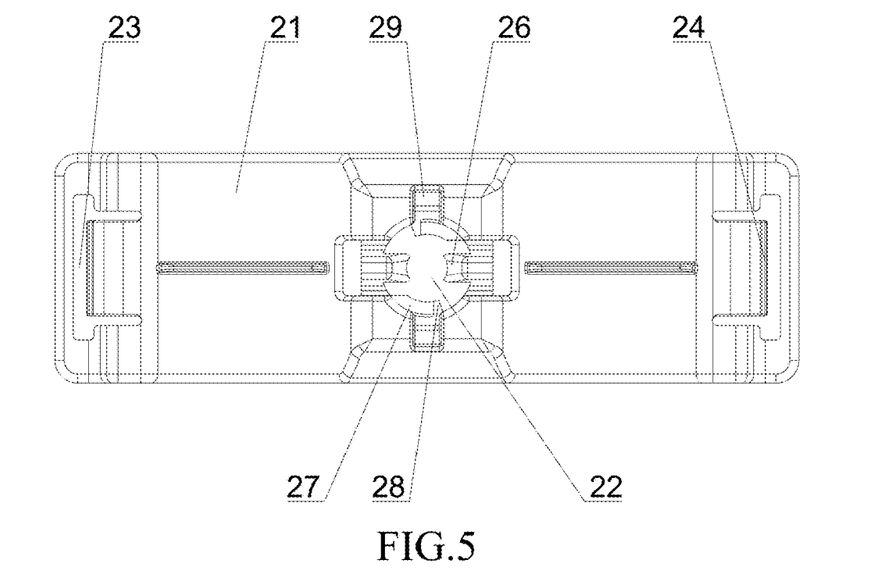
FIG. 5 is a bottom view of the aspect of FIG. 4.

As shown in FIGS. 4 and 5, the upper cover 2 is provided with a pressing concave cavity 21 corresponding to each arc-shaped concave cavity 11, and a pipe cavity is to be formed by combining one arc-shaped concave cavity 11 and one pressing concave cavity 21. The upper cover 2 is provided with a perforation 22 corresponding to the connecting column 12 illustrated in FIG. 2. The connecting column 12 penetrates through the perforation 22 so that the upper cover 2 can rotate around the connecting column 12. The upper cover 2 is provided with insertion slot 23 (illustrated in FIG. 5) corresponding to the rack 13, and a clamping edge 24 is provided within the insertion slot 23. When the clamping edge 24 acts on the rack 13, the upper cover 2 and the base 1 are locked relative to each other. The deformation of the clamping edge 24 is to realize the switch from the active state to the non-active state of the rack 13. Because it is a plastic member, its material itself has certain elastic deformation. A pressing portion 25 (illustrated in FIG. 4) that facilitates driving and deformation extends from the clamping edge 24. Particularly, the pressing portion 25 on the two sides can be pinched, so that the clamping edges 24 do not act on the racks 13, and the combination state is released. If the pressing portion 25 is released, the clamping edge 24 is reset, and the rack 13 is locked.

Considering that the separate parts are easy to miss and disorder, the base 1 and the upper cover 2 can be connected into a whole. The end part of the connecting column 12 is provided with a limit flange 14 (illustrated in FIGS. 2 and 3), and the perforation 22 is provided with a hook 26 (illustrated in FIG. 5) to stop the limit flange 14 to prevent the upper cover 2 from coming out.

Figure 6:
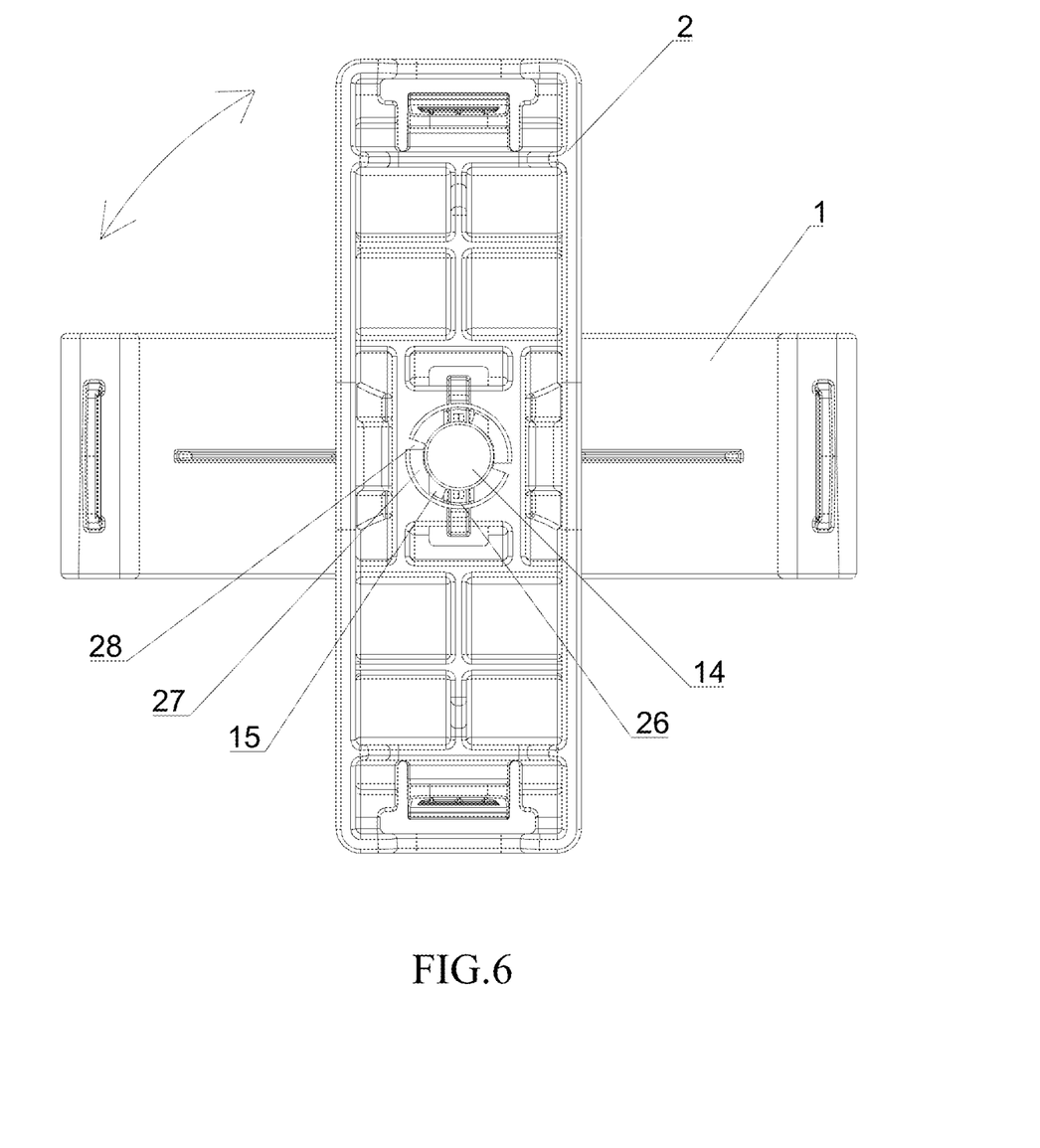
FIG. 6 is an open schematic view of a pipe clip for quick mount and release provided by an aspect.

In order to realize the accurate combination of the upper cover 2 with the base 1 and avoid the misassembly, a sector block 15 (illustrated in FIG. 3) protrudes from the curved wall of the limit flange 14, and a first stopper 27 (illustrated in FIG. 5) is provided on the inner wall of the perforation 22. When the sector block 15 and the first stopper 27 are axially overlapped or partially overlapped, the axial displacement of the connecting column 12 is restricted. When the sector block 15 and the first stopper 27 are axially misaligned, the connecting column 12 can freely pass through the perforation 22. In aspects, a second stopper 28 (illustrated in FIGS. 4-6) for limiting the rotation direction of the sector block 15 is erected on one end of the first stopper 27, as illustrated in FIG. 6.

Further, a convex block 16 (illustrated in FIG. 2) is provided in the middle of the connecting column 12. When the axial displacement of the connecting column 12 is restricted, the convex block 16 is pressed against the hook 26. When the connecting column 12 can freely pass through the perforation 22, the convex block 16 and the hook 26 are dislocated, so that dual protection and precise action are realized.

Two sector blocks 15 may be provided. The sector blocks 15 may be centrally symmetric. The central angle of the sector blocks 15 is 75° to 90°. Two first stoppers 27 may be provided and may be centrally symmetric, so as to limit that the upper cover 2 can rotate by only about 90° relative to the base 1, as shown in FIG. 6, which is sufficient for realizing the opening and fastening functions.

In addition, a positioning plate 17 (illustrated in FIGS. 2 and 3) is provided at the root of the connecting column 12, and a positioning groove 29 (illustrated in FIG. 5) is opened on the upper cover 2. When the upper cover 2 is combined with the base 1, the rack 13 is inserted into the insertion slot 23, while the positioning plate 17 is inserted into the positioning groove 29.

The surfaces of the arc-shaped concave cavity 11 and the pressing concave cavity 21 are respectively provided with convex ribs 18 (illustrated in FIGS. 2 and 3) so as to fill some pipe cavity gaps and improve the fixing effect for the wiring harness.

The base 1 is provided with an installation clip 19 for connection and fixation in order to mount the entire pipe clip at a specific position.

To sum up, the above example pipe clip for quick mount and release is mainly in the form of the clamping edges matching with the racks, the mount and the release can be simply completed through inserting and buckling as well as pressing by fingers. In addition, the wiring harness can be simply avoided by rotating the upper cover, which facilitates the operation. Then by changing the position where the clamping edge fits with the clamping teeth on the rack, the gap between the upper cover and the base is adjusted, and in turn the size of the pipe cavity is adjusted, which facilitates the adaption to various wire harness pipe diameters, and improves the universality. Additionally, the upper cover is provided with an anti-disengagement structure, and thus the storage and the transportation are convenient.

The foregoing embodiments are merely illustrative of the principles and features of the disclosed pipe clips for quick mount and release, which is not limited to the above-described embodiments. Without departing from the spirit and scope of the disclosed pipe clips for quick mount and release, various modifications and changes can be made to the pipe clips, all of which fall within the scope of the disclosed pipe clips as claimed. The scope claimed by the disclosed pipe clips is defined by the appended claims and equivalents thereof.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying Drawings and terms discussed herein may be indicative of one or more items or terms, and thus reference may be made interchangeably to single or plural forms of the items and terms in this written description.

What is claimed is:

1. An apparatus comprising:
   a base, the base defining a first arc-shaped concave cavity and a second arc-shaped concave cavity, the base further defining an outer side portion, the outer side portion comprising:
      a first rack located on a first end of the base;
      a second rack located on a second end of the base;
      a connecting column positioned between the first rack and the second rack; and
      a positioning plate provided at a root of the connecting column; and
   an upper cover, the upper cover defining a first pressing concave cavity corresponding to the first arc-shaped concave cavity and a second pressing concave cavity corresponding to the second arc-shaped concave cavity, the upper cover and base configured to form a pipe cavity when assembled together, the upper cover further comprising:
      a perforation corresponding to the connecting column, the connecting column configured to penetrate through the perforation so that the upper cover can rotate around the connecting column; and
      a first insertion slot corresponding to the first rack, the first insertion slot further comprising a first clamping edge configured to act on the first rack;
      a second insertion slot corresponding to the second rack, the second insertion slot further comprising a second clamping edge configured to act on the second rack; and
      a positioning groove defined in the upper cover,
      wherein when the upper cover is combined with the base, the first and second racks are inserted into the first and second insertion slots and the positioning plate is inserted into the positioning groove, and
      wherein when the first and second clamping edges act on the first and second racks, the upper cover and the base are locked relative to each other.

2. The apparatus of claim 1, wherein the connecting column further comprises an end including a limit flange, and the perforation comprises a hook configured to stop the limit flange to prevent the upper cover from coming out.

3. The apparatus of claim 2, further comprising:
   at least one sector block that protrudes from a curved wall of the limit flange; and
   at least one first stopper provided on an inner wall of the perforation.

4. The apparatus of claim 3, wherein when the at least one sector block and the at least one first stopper are axially overlapped or partially overlapped, an axial displacement of the connecting column is restricted.

5. The apparatus of claim 4, wherein a convex block is provided in a middle of the connecting column, when the axial displacement of the connecting column is restricted, the convex block is pressed against the hook.

6. The apparatus of claim 5, further comprising:
   a positioning plate provided at a root of the connecting column; and
   a positioning groove defined in the upper cover, wherein when the upper cover is combined with the base, the first and second racks are inserted into the first and second insertion slots and the positioning plate is inserted into the positioning groove.

7. The apparatus of claim 3, wherein when the at least one sector block and the at least one first stopper are axially misaligned, the connecting column can freely pass through the perforation.

8. The apparatus of claim 7, wherein a convex block is provided in a middle of the connecting column, when the connecting column can freely pass through the perforation, the convex block and the hook are dislocated.

9. The apparatus of claim 3, further comprising:
   at least one second stopper configured for limiting a direction of rotation of the sector block, the at least one second stopper erected on an end of the at least one first stopper.

10. The apparatus of claim 3, wherein the at least one sector block comprises two centrally symmetric sector blocks.

11. The apparatus of claim 10, wherein a central angle of the sector blocks is 75° to 90°.

12. The apparatus of claim 3, wherein the at least one first stopper comprises a pair of centrally symmetric first stoppers.

13. The apparatus of claim 1, wherein each of the base and the upper cover is integrally injection-molded.

14. The apparatus of claim 1, wherein a pressing portion that facilitates driving and deformation extends from at least one of the first or second clamping edges.

15. The apparatus of claim 1, wherein at least one surface of the first and second arc-shaped concave cavities and at least one surface of the first and second pressing concave cavities are respectively provided with convex ribs.

16. The apparatus of claim 1, wherein the base is provided with an installation clip for connection and fixation.

17. The apparatus of claim 1,
wherein the connecting column further comprises an end including a limit flange, and the perforation comprises a hook configured to stop the limit flange to prevent the upper cover from coming out,
wherein a sector block protrudes from a curved wall of the limit flange and a first stopper is provided on an inner wall of the perforation, when the sector block and the first stopper are axially misaligned, the connecting column can freely pass through the perforation, and
wherein a convex block is provided in a middle of the connecting column, when the connecting column can freely pass through the perforation, the convex block and the hook are dislocated.

18. The apparatus of claim 1, wherein a deformation of the first and second clamping edges realizes a switch from an active state to a non-active state of the first and second racks.

19. An apparatus comprising:
a base, the base defining a first arc-shaped concave cavity and a second arc-shaped concave cavity, the base further defining an outer side portion, the outer side portion comprising:
    a first rack located on a first end of the base;
    a second rack located on a second end of the base;
    a connecting column positioned between the first rack and the second rack, the connecting column further comprising an end including a limit flange and a convex block in a middle of the connecting column; and
    a sector block that protrudes from a curved wall of the limit flange; and
an upper cover, the upper cover defining a first pressing concave cavity corresponding to the first arc-shaped concave cavity and a second pressing concave cavity corresponding to the second arc-shaped concave cavity, the upper cover and the base are configured to form a pipe cavity when assembled together, the upper cover further comprising:
    a perforation corresponding to the connecting column, the perforation further comprising a hook configured to stop the limit flange to prevent the upper cover from coming out and a first stopper provided on an inner wall of the perforation, the connecting column configured to penetrate through the perforation so that the upper cover can rotate around the connecting column;
    a first insertion slot corresponding to the first rack, the first insertion slot further comprising a first clamping edge configured to act on the first rack; and
    a second insertion slot corresponding to the second rack, the second insertion slot further comprising a second clamping edge configured to act on the second rack,
wherein when the first and second clamping edges act on the first and second racks, the upper cover and the base are locked relative to each other,
wherein when the sector block and the first stopper are axially misaligned, the connecting column can freely pass through the perforation, and
wherein when the connecting column can freely pass through the perforation, the convex block and the hook are dislocated.

20. An apparatus comprising:
a base, the base defining a first arc-shaped concave cavity and a second arc-shaped concave cavity, the base further defining an outer side portion, the outer side portion comprising:
    a first rack located on a first end of the base;
    a second rack located on a second end of the base;
    a connecting column positioned between the first rack and the second rack, the connecting column further comprising an end that includes a limit flange and a convex block in a middle of the connecting column; and
    a sector block that protrudes from a curved wall of the limit flange; and
an upper cover, the upper cover defining a first pressing concave cavity corresponding to the first arc-shaped concave cavity and a second pressing concave cavity corresponding to the second arc-shaped concave cavity, the upper cover and the base are configured to form a pipe cavity when assembled together, the upper cover further comprising:
    a perforation corresponding to the connecting column, the perforation comprising a hook configured to stop the limit flange to prevent the upper cover from coming out and at least one first stopper provided on an inner wall of the perforation, the connecting column configured to penetrate through the perforation so that the upper cover can rotate around the connecting column;
    a first insertion slot corresponding to the first rack, the first insertion slot further comprising a first clamping edge configured to act on the first rack; and
    a second insertion slot corresponding to the second rack, the second insertion slot further comprising a second clamping edge configured to act on the second rack,
wherein when the first and second clamping edges act on the first and second racks, the upper cover and the base are locked relative to each other,
wherein when the sector block and the at least one first stopper are axially overlapped or partially overlapped, an axial displacement of the connecting column is restricted, and
wherein the axial displacement of the connecting column is restricted, the convex block is pressed against the hook.

* * * * *